Nov. 18, 1924.
C. N. OLSEN
GRAVEL SEPARATOR
Filed April 12, 1924
1,516,204
2 Sheets-Sheet 2
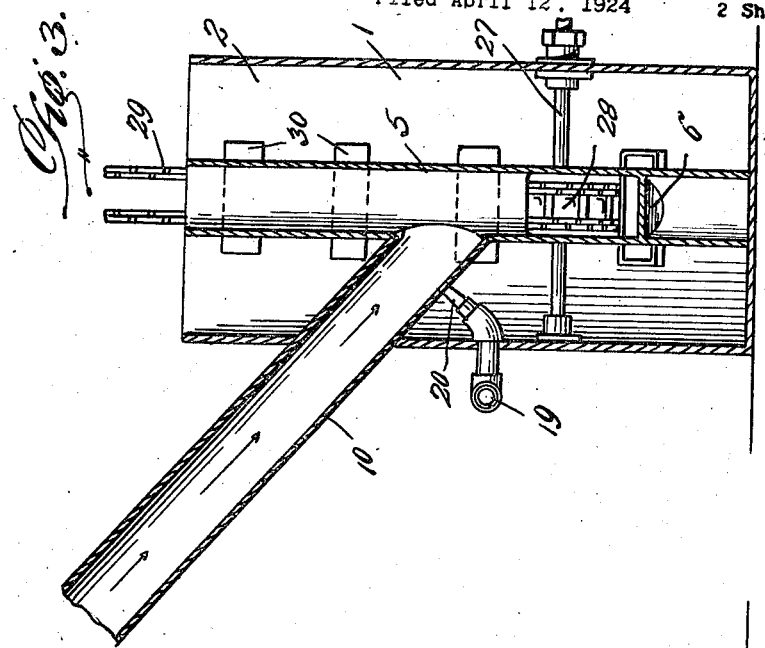
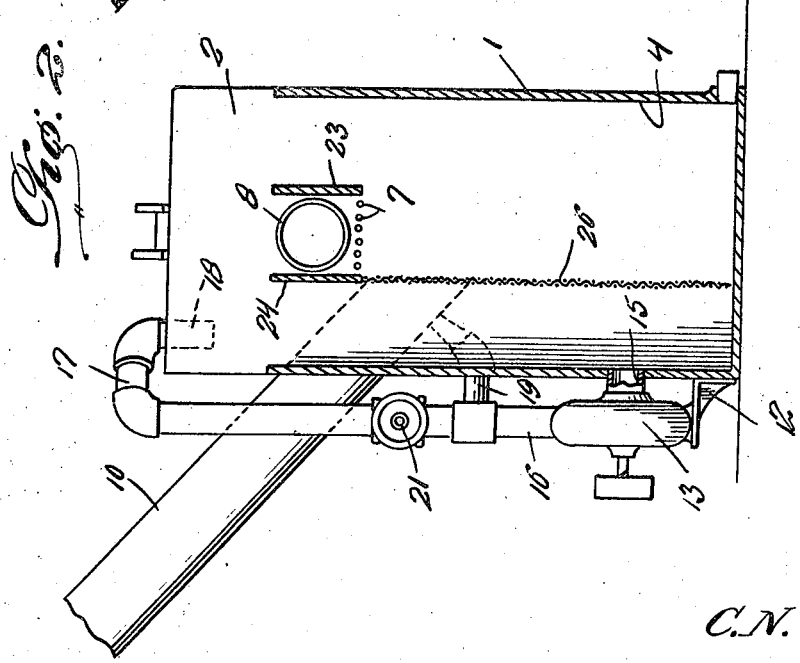
C. N. Olsen
Inventor
By Clarence A. O'Brien
Attorney Patented Nov. 18, 1924.

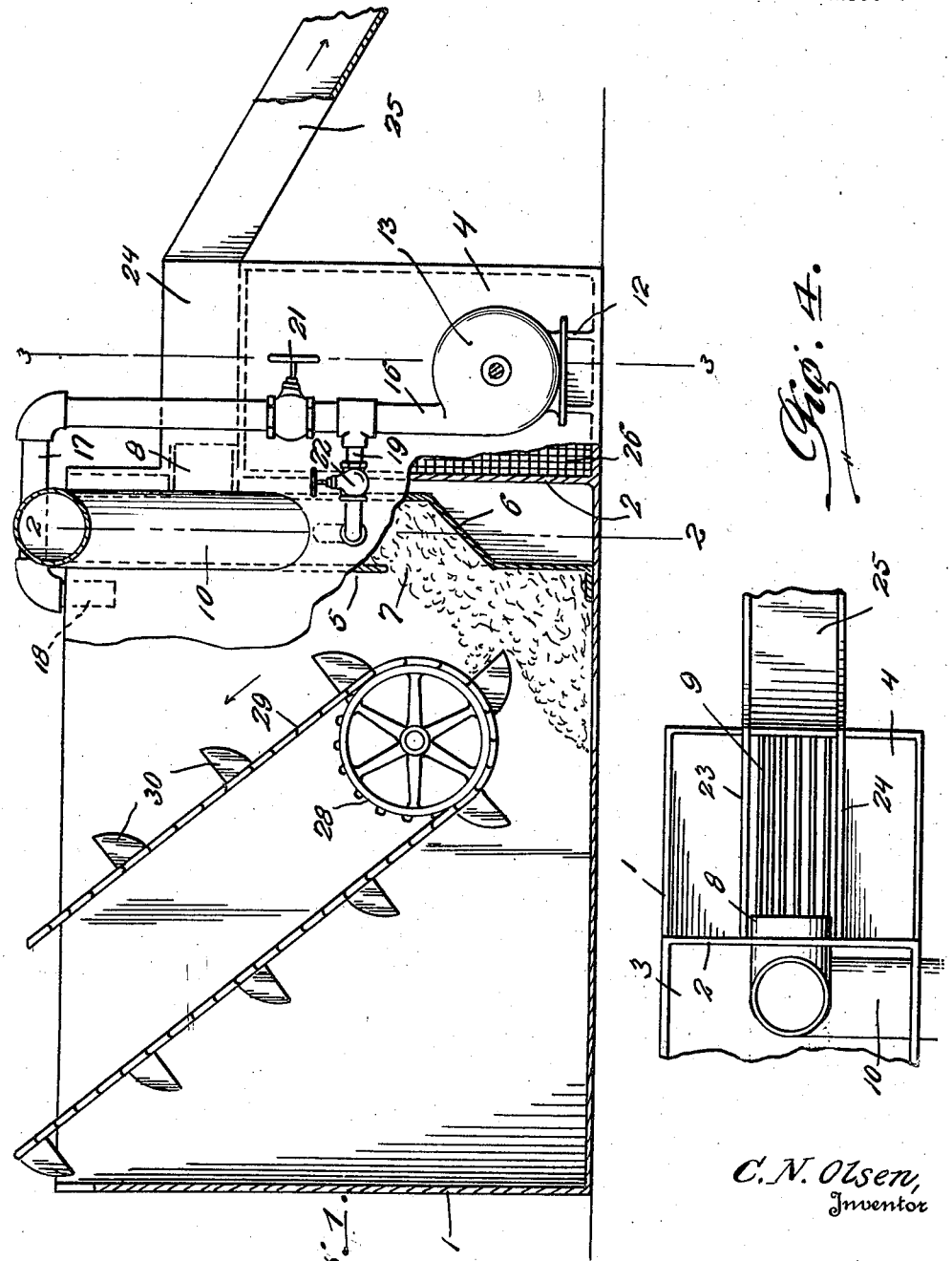

1,516,204

UNITED STATES PATENT OFFICE.

CARL N. OLSEN, OF PUEBLO, COLORADO, ASSIGNOR OF ONE-HALF TO THE FOUNTAIN SAND AND GRAVEL COMPANY, OF PUEBLO, COLORADO.

GRAVEL SEPARATOR.

Application filed April 12, 1924. Serial No. 706,119.

*To all whom it may concern:*

Be it known that I, CARL N. OLSEN, a citizen of the United States, residing at Pueblo, in the county of Pueblo and State of Colorado, have invented certain new and useful Improvements in a Gravel Separator, of which the following is a specification.

This invention relates to new and useful improvements in means for separating granular material obtained from river beds or the like, and has for its principal object to provide a device wherein means is provided for separating and removing the lighter material such as leaves or the like from the granular material, so that the granular material will be free of any foreign substance.

A further object of the invention is to provide a device of the above mentioned character, wherein a continuous circulation of water through the granular material being separated is provided, thus rendering the operation of the separator economical and providing gravel which may be used for various purposes free of leaves and sticks.

A still further object of the invention is to provide a gravel separator of the above mentioned character, wherein means is associated for retarding downward movement of the granular material obtained from the river bed so that the lighter material may be easily separated therefrom.

A further object of the invention is to provide a device of the above mentioned character, which is simple in construction, inexpensive, strong and durable and furthermore adapted for the purposes for which it is designated.

Other objects and advantages of this invention will become apparent during the course of the following description.

In the accompanying drawings forming a part of this specification and in which like numerals designate like parts throughout the same:

Figure 1 is a side elevation of my improved separator with parts broken away,

Figure 2 is a vertical section taken approximately on line 2—2 of Figure 1,

Figure 3 is a similar section taken on line 3—3 of Figure 1, and

Figure 4 is a fragmentary plan view of the separating trough.

In the drawing, wherein for the purpose of illustration is shown the preferred embodiment of my invention, the numeral 1 designates the tank of my improved separator and extending vertically adjacent one end thereof between the side walls of the tank is the partition 2 which forms the main compartment 3, and an auxiliary compartment 4. The auxiliary compartment 4 has its top portion cut away as more clearly shown in Figure 1 of the drawings, and the purpose of this construction will hereinafter be more fully described.

Extending vertically within the main compartment 3 of the tank 1, adjacent the partition 2 is the conduit 5. The lower portion of the conduit is offset as shown at 6 and the portion thereof facing the end wall of the compartment 3 is cut away as shown at 7, providing a discharge which communicates with the main compartment 3 in the manner as will be presently described.

The upper portion of the conduit 5 is provided with a lateral offset or discharge outlet 8 which extends through a suitable opening provided in the partition 2 and communicates with the grate 9 which is supported on the top of the auxiliary compartment 4 in the manner as illustrated in Figure 4 of the drawings.

Extending through one of the side walls of the crank 1 and arranged within the main compartment 3 is the inclined supply pipe 10, the inner end of which communicates with the vertical conduit 5 in the manner clearly illustrated in Figure 3 of the drawings. If desired any suitable means such as the provision of a continuous fine spray of water may be provided for retarding the flow of the gravel as the same moves downwardly through the supply pipe and discharges into the vertical conduit 5, in the manner as will be hereinafter more fully described.

Supported on a suitable bracket 12 arranged on the side of the tank 1 adjacent the auxiliary compartment 4 in the manner clearly illustrated in Figure 1 of the drawings, is a pump designated generally by the numeral 13 and as the same may be of any well known construction, it is not thought necessary to further go in detail relative to the same. The rotary pump 13 is adapted to communicate with the auxiliary compartment 4 by means of the inlet pipe 15 in the manner as illustrated in Figure 2 of the drawings. The outlet pipe 16 of the pump 13 extends vertically adjacent the outer side of the auxiliary compartment 4 and has a lateral extension 17 provided on the upper portion thereof and which terminates in the downwardly extending portion 18 whereby communication is had with the main compartment 3. The extension 18 is preferably disposed in the main compartment 3 adjacent the vertical conduit 5 in the manner as is clearly illustrated in Figure 1 of the drawings.

The outlet pipe 16 is further provided with a by-pass 19 which has a nozzle 20 carried by the inner end thereof and the same extends through the side wall of the main compartment 3 and communicates with the lower portion of the inclined supply pipe 10 in the manner as shown more clearly in Figures 2 and 3 of the drawings. Suitable valves such as are shown at 21 and 22 in the drawings are provided for the outlet pipe 16 and the by-pass pipe 19 respectively for the purposes well known in the art. Any suitable means may be provided for actuating the pump and I do not wish to limit myself to the particular manner in which the same is actuated for the purposes of carrying out the objects of the present invention.

As heretofore set forth, the pump of the auxiliary compartment 4 has the grate bars 9 extending between the partition 2 and the end wall of the auxiliary compartment and the same are disposed directly below the end of the lateral discharge pipe 8. Suitable side walls such as are shown at 23 and 24 respectively in the drawings are provided in connection with the grate bars and extend also between the partition and the end wall and cooperating with the grate bars 9 is the trough 25. Also arranged in the auxiliary compartment 4 and disposed between the vertical partition 2 and the end wall of the compartment is the vertical screen 26. This arrangement is more clearly illustrated in Figure 2 of the drawings. The purpose of this screen will also be hereinafter more fully described.

Extending transversely through the side walls of the main compartment 3 of the tank 1 adjacent the vertical conduit 5 is the shaft 27. The shaft is journaled in the side walls in any suitable manner and adapted to be supported on the central portion thereof and further adapted to be rotated therewith is the sprocket wheel 28 around which is trained the sprocket chain 29. Extending transversely at predetermined spaced intervals on the sprocket chain 29 are the buckets 30 and the purpose thereof is to provide a means for elevating and removing the gravel within the main compartment 3 therefrom for use whenever desired. Any suitable means may be provided for actuating the sprocket wheel 28 and as the same is well known in the art, it is not thought necessary to further go in detail relative to the same.

The operation of my gravel separator may be briefly stated as follows—usually when gravel is taken from a river bed, the same is commingled with leaves, sticks and other foreign substances. For the purpose of separating the lighter materials from the gravel before the gravel is used, the granular material as taken from the river bed is deposited in the supply pipe 10, and as the same moves downwardly therein, a fine spray of water will tend to cause the same to move downwardly in a substantially fine stream. With the pump in operation and the valves open, a jet of water will be forced through the nozzle 20 into the lower portion of the supply pipe 10 so that the latter material commingled with the gravel will be caused to be forced upwardly into the conduit 5 and discharged out through the lateral extension 8 and the same moves over the grated bars 9 and is discharged onto the trough 25. It is of course to be understood that a certain amount of water will be carried upwardly with the leaves so as to facilitate the same being discharged through the lateral pipe 8 and onto the trough 25, and the water upon reaching the grated bars 9 will drop into the auxiliary compartment 4. The sand after having been separated from the leaves and sticks moves downwardly in the vertical conduit 5 and is discharged through the outlet 7 into the main compartment 3. The outlet pipe 16 will have the valve 21 open and the downwardly extending portion 18 formed on the upper end thereof will cause a supply of water to be delivered to the sand or gravel in the main compartment 3, thus circulating the same within the compartment. The water in the auxiliary compartment 4 will be filtered through the screen 26 and will then be caused to be supplied to the pump 13 through the medium of the pipe 15, thereby providing a means for providing a continuous circulation of water through the compartment and the pipes whereby the sand or gravel may be easily and efficiently cleaned and separated free from any leaves or sticks. The clean gravel may then be removed from the main compartment 3 whenever it is desired to use the same by means of the endless chain 29 and the buckets 30 carried thereby in the usual manner.

It will thus be seen from the foregoing description, that a gravel separator has been provided which will thoroughly and efficiently separate the gravel from the leaves and sticks which are commingled therewith when the same is obtained from the river bed, and a device of this character may not only be inexpensive, but the construction thereof is such as to enable the same to be operated by a single person and will further be strong and durable.

While I have shown the preferred embodiment of my invention, it is to be understood that various changes in the size, shape and arrangement of parts may be resorted to without departing from the spirit of the invention and scope of the appended claims.

Having thus described the invention, what I claim is:—

1. A gravel separator comprising a tank, a vertical partition in said tank providing a main and auxiliary compartments, a vertical conduit arranged in the main compartment having its lower portion discharging into the main compartment, a supply pipe communicating with the vertical conduit, a lateral extension provided on the upper portion of said vertical conduit, grate bars supported in said auxiliary compartment and communicating with the lateral extension, a trough associated with said grate bars, and means for separating the lighter materials from the gravel forcing the same upwardly through the vertical conduit and discharging the same through the lateral extension onto said grate bars and said troughs, the gravel being discharged downwardly through the vertical conduit into the main compartment, and means for providing a continuous circulation of water through the compartment, the supply pipe and vertical conduit.

2. A gravel separator comprising a tank, a vertical partition in said tank providing a main and auxiliary compartments, a vertical conduit arranged in the main compartment a supply pipe communicating with the vertical conduit, a lateral extension provided on the upper portion of said vertical conduit, grate bars supported in said auxiliary compartment and communicating with the lateral extension, a trough associated with said grate bars, means for separating the lighter materials from the gravel forcing the same upwardly through the vertical conduit and discharging the same through the lateral extension onto said grate bars and said troughs, the gravel being discharged downwardly through the vertical conduit into the main compartment, said means comprising a pump communicating with the auxiliary compartment, an outlet pipe communicating with the main compartment, and a by-pass extending from the outlet pipe and communicating with the inner end of the supply pipe.

3. A gravel separator comprising a tank, a vertical partition in said tank providing a main and auxiliary compartments, a vertical conduit arranged in the main compartment having its lower portion discharging into the main compartment, a supply pipe communicating with the vertical conduit, a lateral extension provided on the upper portion of said vertical conduit, grate bars supported in said auxiliary compartment and communicating with the lateral extension, a trough associated with said grate bars, means for separating the lighter materials from the gravel forcing the same upwardly through the vertical conduit and discharging the same through the lateral extension onto said grate bars and said troughs, the gravel being discharged downwardly through the vertical conduit into the main compartment, and means in said compartment for conveying the gravel therefrom.

4. A gravel separator comprising a tank, a vertical partition arranged therein providing a main compartment and an auxiliary compartment, a vertical conduit arranged in said main compartment adjacent said main partition and having the lower end thereof offset and provided with a discharge outlet communicating with the main compartment, a lateral extension provided on the upper portion of said vertical conduit and extending through an opening provided in the vertical partition, grate bars supported in the auxiliary compartment and cooperating with the lateral extension, a trough associated with the grate bars, a supply pipe extending through the side walls of the main compartment and communicating at its inner end with the vertical conduit, a pump supported on said tank and communicating with the auxiliary compartment, an outlet pipe for said pump having its discharge end extending into the main compartment, a by-pass extending from the outlet pipe through the side wall of the main compartment, a nozzle on said by-pass extending into the lower end of the supply pipe to force said supply of water through the gravel passing downwardly in the supply pipe so as to cause the lighter materials to be delivered upwardly through the vertical conduit and discharged out through the lateral extension onto the grate bars and to the trough, the water passing through the lateral extension returning to the auxiliary compartment, and a screen arranged in the auxiliary compartment.

5. A gravel separator comprising a tank, a vertical partition arranged therein providing a main compartment and an auxiliary compartment, a vertical conduit arranged in said main compartment adjacent said main partition and having the lower end thereof offset and provided with a discharge outlet communicating with the main compartment, a lateral extension provided on the upper portion of said vertical conduit and extending through an opening provided in the vertical partition, grate bars supported in the auxiliary compartment and cooperating with the lateral extension, a trough associated with the grate bars, a supply pipe extending through the side walls of the main compartment and communicating at its inner end with the vertical conduit, a pump supported on said tank and communicating with the auxiliary compartment, an outlet pipe for said pump having its discharge end extending into the main compartment, a by-pass extending from the outlet pipe through the side wall of the main compartment, a nozzle on said by-pass extending into the lower end of the supply pipe to force said supply of water through the gravel passing downwardly in the supply pipe so as to cause the lighter materials to be delivered upwardly through the vertical conduit and discharged out through the lateral extension onto the grate bars and to the trough, the water passing through the lateral extention returning to the auxiliary compartment, a screen arranged in the auxiliary compartment, and means in said main compartment for conveying the gravel therefrom.

In testimony whereof I affix my signature.

CARL N. OLSEN.